Figure 1:
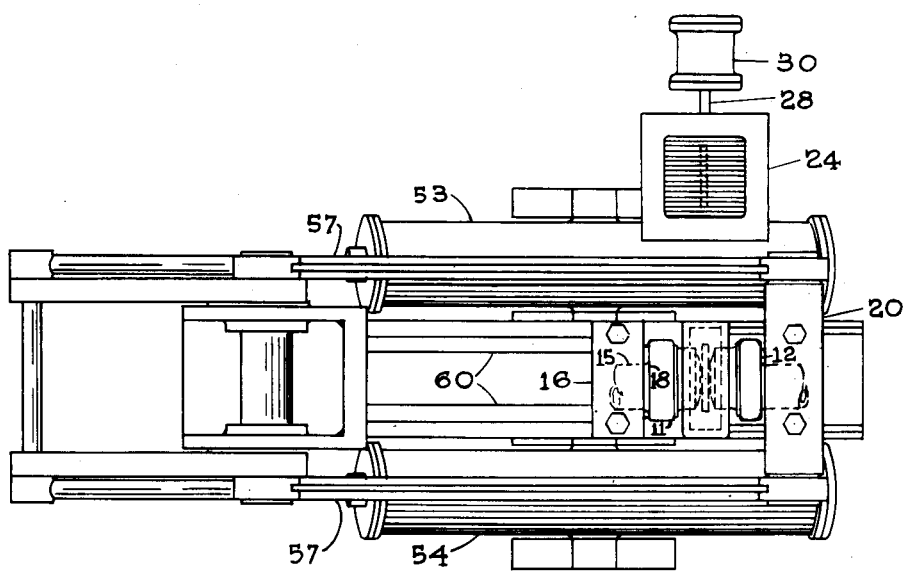

Jan. 22, 1952      W. C. DUNN      2,583,362
WELDING SHAFT AND THE LIKE

Filed Oct. 22, 1949      2 SHEETS—SHEET 1

INVENTOR.
William C. Dunn

Jan. 22, 1952     W. C. DUNN     2,583,362
WELDING SHAFT AND THE LIKE
Filed Oct. 22, 1949     2 SHEETS—SHEET 2

INVENTOR.
William C. Dunn.

Patented Jan. 22, 1952

2,583,362

UNITED STATES PATENT OFFICE 2,583,362

WELDING SHAFT AND THE LIKE

William C. Dunn, Cleveland, Ohio, assignor to The Ohio Crankshaft Company, Cleveland, Ohio, a corporation of Ohio Application October 22, 1949, Serial No. 122,896

5 Claims. (Cl. 219—10)

The present invention relates primarily to a method and apparatus for making butt welds, chiefly welds designated generally as pressure butt welds, and includes a crankshaft which is a product particularly well adapted to be produced by this method and apparatus. Numerous other products made from a wide variety of materials can be produced advantageously by the method hereinafter described.

This application is a continuation-in-part of my copending application Serial No. 615,331 filed September 10, 1945, now abandoned.

To avoid the necessity of machining away large amounts of metal required in making parts as ordinary hammer forgings, dies are now used extensively in producing such parts, which parts are ordinarily referred to as drop forgings. Dies for drop forgings are somewhat expensive, especially when they are made for large parts of complicated form such as crankshafts, and the manipulations of the billets and roughly-formed parts to complete successive operations in the dies becomes difficult when the mass of metal is large. It has been long recognized that a large amount of labor and other expense such as that due to the size and number of dies could be avoided if such forgings could be made in short and easily handled sections and these sections then joined by welding into the single unit required.

Heretofore, butt welding of small forgings into large crankshafts has been found unsatisfactory due to the crankshafts being highly stressed when in use and the weld, when made by former methods, having less strength than other and adjacent metal and not being of a quality to resist fatigue caused by unexpected stresses which often result from abnormal conditions such as torsional vibrations in a crankshaft. The success of a welded forging thus depends primarily on the strength and quality of the weld or welds joining the various parts. It will be understood that a crankshaft for a multiple-cylinder engine can be made from a large number of relatively small and frequently identical forgings requiring only a few small forging dies and simple machining operations and tools.

Crankshafts, in order to have the necessary strength to withstand the extreme abuses to which they are subjected, are ordinarily made of steels having in excess of .35 per cent carbon and generally close to .50 per cent. As is generally known, the successful pressure butt welding of steels having carbon content in excess of .35 per cent carbon is relatively rare where the final weld must have extremely high mechanical and metallurgical specifications comparable to that of the base metal.

In the pressure-welding field where no additional metal is deposited, there are two general methods for heating the metal surfaces to the desired and necessary welding temperature. One of these methods is to machine the surfaces to be welded flat and smooth, place the surfaces in pressure, air-excluding engagement and apply heat to the metal adjacent to the surfaces. The heat travels inwardly through the metal to the surfaces by conduction. The other method is to hold the surfaces in spaced-apart relationship and apply the heat directly to the surfaces with a suitable heating means positioned between the surfaces.

In the former method, temperature differentials across the surfaces in engagement make a good weld difficult to obtain. This is particularly true where large-area surfaces are to be welded. Also, the time required for the heating is unduly long.

The latter method avoids the difficulties of uneven and slow heating but introduces the problem that the surfaces may be exposed to the surrounding atmosphere and the heated metal may oxidize or, when higher carbon steels are employed, be decarburized. There is also the difficulty of the slight cooling of the surfaces during the brief instant of time it requires to remove the heating means from between the surfaces and then bring the surfaces into pressure engagement.

The present invention contemplates heating the surfaces in accordance with the latter manner; that is, with the surfaces in spaced-apart relationship with a high-frequency, induction-heating coil disposed between the surfaces for the purpose of inducing high-frequency electric heating currents to flow in the surfaces directly. To prevent oxidation of the metal as it becomes heated, the invention contemplates performing at least the heating in a controlled atmosphere where all oxygen has been excluded and the atmosphere is of such a character as to prevent decarburization of the metal and, preferably, to effect some carburization. If carburization occurs, the welding may be effected at a slightly lower temperature. Also, in some instances, the carburization serves to provide a slightly stronger metal in the immediate area of the weld, thus compensating for any inherent weaknesses of the weld itself.

Further, in accordance with the invention, a housing or enclosure surrounds and is in gas-sealing arrangement with the inductor and the metal parts to be welded. The inductor employed generally will have approximately the same surface area as the area of the surfaces to be welded; and, where large surfaces are to be welded, the inductor will have a considerable bulk in physical size. The housing is so constructed and arranged that the inductor may be quickly withdrawn from between the surfaces at the moment when the surfaces have reached the desired welding temperature and the surfaces then brought quickly to welding engagement.

The invention further contemplates, particularly in the welding of large-diameter journals of crankshafts, recessing or boring out the central part of the journal surface to be welded. With such a construction, the ease of heating the surfaces and the quality and strength of the final weld is considerably improved. By such a construction, it is easier to obtain a more uniform heating of the surfaces when induction heating is employed. Less total heat and heating time is required. Further, the bead or upset formed by the plastic flow of the metal under pressure can be made to extend inwardly into the recess, thus providing an increased cross-sectional area of welded surface over that of the cross-sectional area of the journal immediately adjacent the weld. The bead need not be machined away. This formation of the bead inwardly into the recess may be caused by restraining the outer surfaces of the metal or by so shaping the surfaces to be welded that the plastic flow is in an inward direction. If desired, the bead may be allowed to form on the outside of the journal also, which bead is then subsequently machined away.

The invention further contemplates continuously moving the inductor loop during the heating period so as to provide a more uniform degree of heating over the entire surfaces to be welded.

Accordingly, it is an object of this invention to provide a new and improved method for welding or fusing together two or more metal parts to form a single integral unit.

Another object is to so provide a welded or fused section joining the parts of an article that the welded section will be at least as resistant to stresses as other parts of the article.

A further object is to provide a method generally adaptable to fusing together parts of a variety of articles and a variety of materials from which such articles can be made.

An additional object is to provide an apparatus capable of being changed by simple modifications to make it adaptable to fusing together parts of a variety of articles.

Another object is to provide a built-up crankshaft having physical properties equal to those of such shaft when made of a single-piece forging.

Another object of the invention is to provide an improved method of pressure or forge welding two steel surfaces wherein the surfaces are heated in spaced-apart relationship in an atmosphere which will effect some carburization of the surfaces whereby the welded area will have a slightly greater strength and may be welded at a lower temperature than if the carburization did not occur.

Another object is to provide in pressure welding, wherein a high-frequency inductor is to be disposed between the surfaces to be welded for the purposes of heating them, a housing surrounding the inductor and the surfaces for maintaining a controlled atmosphere so constructed and arranged that the inductor may be readily removed from between the surfaces at the time the welding is to be effected.

Still another object of the invention is the provision of a new and improved method of pressure welding half sections of the journals of the crankshaft which comprises providing the faces of the half journals to be welded with an axial central bore, heating the recessed surfaces with electric high-frequency induced heat and bringing the surfaces into pressure-welding engagement.

Still another object of the invention is to heat a pair of surfaces to be pressure welded with a high-frequency inductor wherein the inductor is disposed between the surfaces and continuously moved in the plane of the surfaces.

With these and other objects in view, the said invention comprises the method hereinafter described with one form of apparatus adaptable to use in this method and one type of product made by this method and apparatus.

Figure 2:
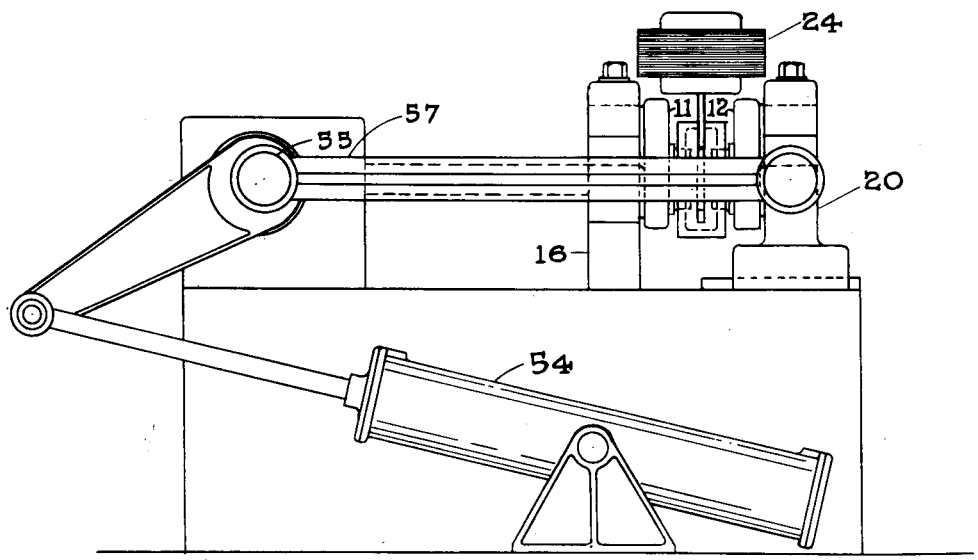
Figure 3:
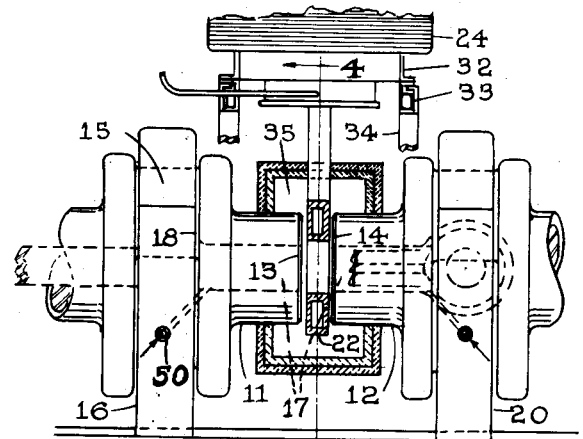
Figure 4:
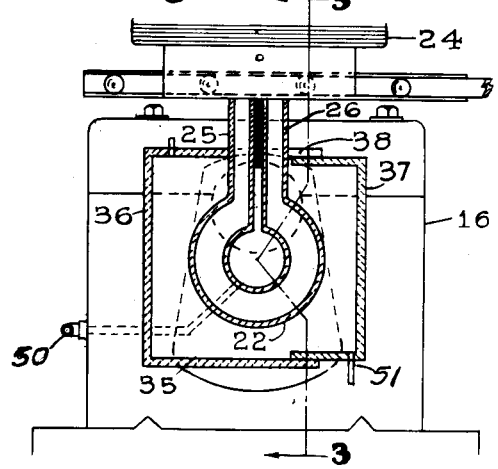
Figure 5:
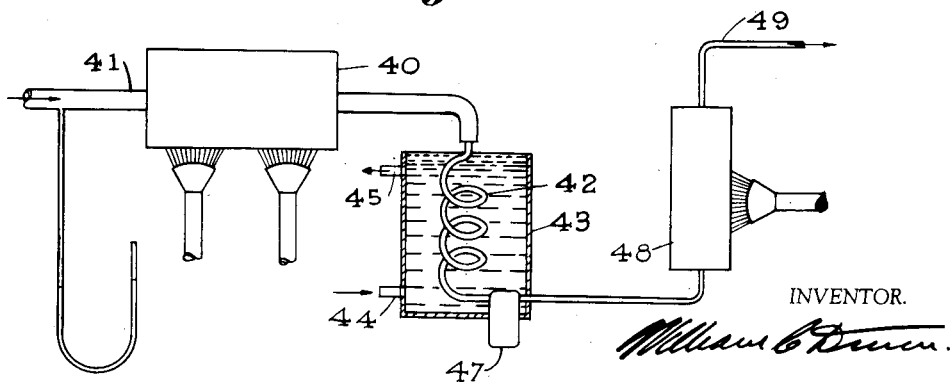

The form of the apparatus adapted to welding together at the center of a journal two sections of a crankshaft is shown in the accompanying drawings in which:

Figure 1 is a plan view of the welding fixture;
Figure 2 is an elevation of this fixture;
Figure 3 is a section on a somewhat enlarged scale taken as indicated substantially at 3—3 of Figure 4 and shows the inductor in heating position;
Figure 4 is a section as indicated at 4—4 of Figure 3; and
Figure 5 shows diagrammatically apparatus for providing the controlled atmosphere.

Referring now particularly to Figures 1, 2, 3 and 4 of the drawings which illustrate one form of apparatus adapted to the practice of this improved method of welding, 11 and 12 indicate two parts of a crankshaft which are to be welded together substantially at a central part of a main bearing or journal. The metal from which the crankshaft is made may be of any desired material, but this invention is particularly applicable to crankshaft forgings having a carbon content in excess of .35 per cent carbon and proceeding on up to beyond .50 per cent carbon. The ends 13 and 14 to be joined are premachined as indicated to facilitate the flow of metal when the parts are brought into pressure engagement after heating. This premachining also includes providing the ends with an axial bore or opening 17 having a cross-sectional diameter approximately one-half the cross-sectional diameter of the end. As the principal stresses in a crankshaft journal are in the outer portions thereof, this bore 17 actually weakens the shaft very little, if at all. Further, the bore provides advantages hereinafter to be pointed out. The bore may also be formed in the forging operation or both. The part 11 is located angularly by means of crankpin 15 engaging a recess in pressure block 16. One face of this block is held in firm surface-to-surface contact with an outer face of the crank arm or cheek as at 18. Part 12 is similarly located in pressure block 20 so as to hold the two ends 13 and 14 of the journal in coaxial relation.

To bring the oppositely located and premachined faces of journal ends 13 and 14 to welding temperature, a loop-shaped, high-frequency inductor 22 of known construction is inserted therebetween. The inductor is of such size as to carry the necessary current and is cooled by water circulating therethrough. Its outer diameter is usually somewhat larger but may be smaller than the outer diameter of the journal parts to be heated and its inner diameter is likewise somewhat larger than the bore of the journal. The pressure blocks are so located as to hold the faces of the journal ends at correct distances from the sides of the inductor to accomplish optimum heating.

The inductor 22 is attached to a movably-supported transformer 24 by conductors 25 and 26, and is moved into and out of heating position by shifting the transformer to one side. This shifting of the transformer is accomplished by rod 28 connected to a piston in air cylinder 30 shown in Figure 1. The transformer 22 includes a supporting frame 32, supported on rollers 33 and movable along tracks in a frame 34. Movement of the transformer to one side is very rapid and easily accomplished by operation of a valve in piping supplying air to the cylinder 30.

The invention contemplates, as one feature, continuously moving the inductor 22 relative to the surfaces during the heating operation. This movement is for the purpose of insuring a more uniform heating. Thus, the transformer 24 may be oscillated back and forth relative to the frame 34 by the cylinder 30. Alternatively, the inductor 22 may be moved relative to the transformer 24 or the entire frame 34 may be moved. A rotary motion could also be provided. The inductor should move in the plane of the surfaces and remain equally spaced therefrom at all times.

Since it is very important that no harmful reactions occur in the end surfaces during heating, such as oxidation by contact with air or decarburization, and since it is also important that limited reactions do occur which will improve the quality of the weld, a properly selected controlled atmosphere is provided. To confine this atmosphere to the immediate vicinity of the weld, an openable enclosure 35 is provided into which the ends 13 and 14 project from opposite sides through openings having substantial contact with peripheral surfaces of the ends to prevent leakage of the atmosphere from the enclosure. Current of suitable frequency, preferably 10,000 cycles per second, is supplied to the inductor by transformer 24 through conductors 25 and 26 which serve as means for supporting the inductor and which project through an opening in the top portion of enclosure 35. This opening is of such size as to fit closely around the conductors 25 and 26 to prevent leakage of the controlled atmosphere through any clearance spaces which might exist between the conductors and sides of the opening.

To facilitate inserting the inductor in the enclosure, the enclosure is openable as above indicated. This is accomplished by constructing it of two members 36 and 37, an edge portion of 36 telescoping over an edge part of 37 to effect closing the space therein. Conductors 25 and 26 pass through a slot 38 provided in the upper wall of member 36 and substantially contact with the sides of this slot when the enclosure is brought into surrounding relation with the parts to be welded. The enclosure is ordinarily made of a cement and asbestos material which is a good insulation for both electric current and heat. One part of the enclosure is usually attached to and moves with the conductors 25 and 26 so that it is automatically brought into place and removed when the inductor is moved into and out of heating position between the ends of the parts to be welded. The other part of the enclosure is held in place by any suitable means or is manually placed in correct position. In the embodiment shown, the member 37 is held in operative position by telescoping arrangement with the member 36. When the member 36 is moved from its operative position, the member 37 will then drop free and away from the members to be welded.

The character of the atmosphere in the enclosure and its distribution determines to a large extent the character of the weld. It is important that oxygen be excluded and water vapor, which at the welding temperature of the metal decomposes into its constituents; hydrogen and oxygen, must also be eliminated. Under some conditions, hydrogen has an embrittling effect on steel and this effect must be controlled. The distribution of the atmosphere around the section to be welded must be substantially uniform to effect a uniform weld. Figure 5 shows diagrammatically one form of means for providing one composition of gases which has been found satisfactory in crankshaft welding. In this apparatus, natural gas comprising numerous carbon-bearing compounds for carburizing effect is introduced under a pressure of about one inch of water with about 30 per cent of helium into cracking chamber 40 through piping 41. This natural gas and helium mixture is heated and decomposed in the cracking chamber. The decomposed gas passes through coil 42 in condenser 43, condensation being effected by water passing through piping connected at 44 and 45. Condensate produced by the cooling accumulates in the trap 47 and the gas passes through into chamber 48 which is partly filled with heated lithium carbonate. This carbonate is usually heated by a flame applied to the exterior of the chamber. The heated lithium carbonate absorbs any residual moisture so that the gas passing out at 49 for delivery to the welding enclosure is substantially free of all oxygen-forming substances, it containing only inert gases and those adapted to produce the required carburizing.

The principal stresses in a crankshaft journal normally occur in the outer portions of the journal only and, thus, the existence of the bore 17 actually weakens the shaft little, if any at all. On the other hand, the provision of the bore reduces the face area of the surfaces to be welded so that the total heat required is less, the total heating time may be less and the total required welding pressure is considerably reduced. Because of the decreased heating time, the depth of penetration of the welding heat is much less and the amount of upset at the weld is correspondingly less.

Because of the bore, the upset material may flow in two directions, both inwardly and outwardly, so that the tendency for weakening fissures to form is lessened and any occlusions in the surfaces may flow into the upset or bead where their existence will not impair the strength of the weld. This is particularly true with the outside bead which normally is removed by subsequent machining. The upset on the inside is preferably allowed to remain, whereby the final welded cross-sectional area will be slightly greater than the cross-sectional area of the remainder of the journal.

The existence of the bore is also conducive to a more even heating and permits the use of a more efficient type of inductor such as that shown. With such an inductor and without the bore, the central part of the surface would be heated less than the outer portions of the surface. With the bore, however, this undesirable effect is prevented. Moving the inductor during the heating further contributes to even heating.

The apparatus illustrated by the drawings is generally used as follows:

The surfaces to be welded are first machined flat and parallel so that, when finally placed in pressure-welding engagement, the pressure and upset will be evenly distributed circumferentially around the surfaces.

The bore 17 is then machined, if it was not previously provided in the initial forging, leaving enough wall thickness to afford ample strength in the welded area after the two parts had been welded together.

The two parts of the shaft are secured with the crank arms in correct angular position and with the faces opposite the parts to be welded in firm surface-to-surface contact with the pressure blocks 16 and 20. Air is admitted to cylinder 30 to move the transformer forward and to carry the inductor attached thereto into position between the surfaces of the journal which are to be welded together. One half of the enclosure is carried by the inductor into correct position and the other half is supported to engage it in telescoping relation. The gas-generating means of Figure 5 having been put in operation, its piping is connected to opposite ends of the bore through the sections of the journal to be welded or through passages in the presure blocks as shown at 50 in Figures 3 and 4. Thus, gas, in flowing through these bores and radially outward past both sides of the inductor, passes over the surfaces to be welded together. This gas displaces air in the enclosure which escapes through passages such as 51 provided therefor. The air having been expelled, the gas-generating apparatus is regulated to provide the correct amount of gas and of the correct analysis. In some cases, part of the gas is introduced through a side wall of the enclosure in a direction generally tangentially to the cylindrical ends of the journal to be welded to provide a circulation and equalization of the atmosphere around the welding region. Gas may also be introduced through the bore of the journal either from one or both ends.

As soon as air has been expelled from the enclosure and the atmosphere therein is of correct analysis, power is supplied to the inductor through the transformer and the ends of the journal sections to be welded are brought to welding temperature at any desired rate. During the heating, the inductor is continuously oscillated or moved about the axis of the journal and in the plane of the surfaces, thus preventing any dead spots in the heat pattern which might otherwise occur. The rate and duration of heating determines the change effect in the analysis of the metal of the surface zones at the weld, some time usually being required for elements of the controlled atmosphere, such as its carburizing constituent, to enter this surface zone and effect the desired change in its chemical analysis. When the surface metal has been heated to the desired welding temperature and held at that or other temperatures long enough to effect the desired change in its composition, which is usually for a period short enough to prevent unfavorable heating of the adjacent crank arms and parts of the holding means, air at relatively high pressure is admitted to cylinder 30 which quickly moves transformer 24 back, carrying inductor 22 and housing member 36 therewith. As the housing member 37 is supported in operative relationship by being telescoped into the housing member 36 when the housing member 36 is withdrawn, the support for the housing member 37 is thereby removed and the member 37 may drop away from the members being welded by force of gravity.

Following the admission of air to cylinder 30 usually by a fraction of a second, air is admitted simultaneously to cylinders 53 and 54 which rotates eccentric 55 and, through tension rods 57, quickly moves pressure block 20 toward block 16, carrying section 12 of the shaft to be welded toward section 11, thus bringing the heated surfaces into engagement so quickly that the weld is effected before the controlled atmosphere surrounding the journal escapes and is displaced by surrounding air. The pressure applied to the weld is determined by the character of the metals being welded and is regulated by the pressure of the air being admitted to cylinders 53 and 54. Struts 60 serve as means for supporting pressure block 16 against the pressure exerted through rods 57.

The present method is adaptable to numerous modifications. By changing the form of the enclosure, a crank pin or a main journal can be welded directly to a crank arm. By use of two inductors, two such welds can be made simultaneously and an entire crankshaft can thus be built up from relatively small, simple pieces.

By preforming the surfaces of the parts to be welded, the weld can be effected with very little metal becoming extruded in the form of a flash or circumferential rib which must be removed by machining. The metal at the weld, having a somewhat higher carbon content, possesses better hardenability and, after a heating and quenching operation, will be harder and possess wearing qualities better than those of adjacent metal. The increase in the carbon content provided by this method enables the welding to be accomplished at a lower temperature than required when no carburizing in the weld results.

Numerous means other than the one shown for bringing the heated surfaces into pressure engagement may be employed. A toggle joint may be used to multiply pneumatic or hydraulic pressure, or hydraulic pressure may be applied directly to effect the weld. Other means may be employed for producing the controlled atmosphere and the analysis of the atmosphere can be varied to correspond with the character of the substances to be fused together.

Other forms may be employed embodying the features of my invention instead of the one herein explained, change being made as regards the means and the steps herein disclosed and the product produced thereby, provided the elements or steps stated by any of the following claims or the equivalent of such stated elements or steps be employed.

I, therefore, particularly point out and distinctly claim as my invention:

1. In apparatus for butt welding metal objects, means for holding the objects with their surfaces to be welded in confronting spaced relation; a housing enclosing the adjacent end portions of the objects; an induction coil support slidably mounted in the wall of the housing, and an induction coil carried by said support within the housing and movable into and out of the space between the confronting surfaces of the objects by sliding said support and adapted, when it is in said space and when energized by a high-frequency alternating current, to inductively heat said surfaces to welding temperature, said housing being so constructed and arranged that said induction coil may be moved from between said surfaces whereby said surfaces may be brought into abutting relationship.

2. In apparatus for butt welding metal objects, means for holding the objects with their surfaces to be welded in confronting spaced relation; a housing enclosing the adjacent end portions of the objects; an induction coil support slidably mounted in the wall of the housing, and an induction coil carried by said support within the housing and movable into and out of the space between the confronting surfaces of the objects by sliding said support and adapted, when it is in said space and when energized by a high-frequency alternating current, to inductively heat said surfaces to welding temperature, said housing being formed in two parts, one of said parts being carried by said inductor and movable therewith when the inductor is moved out of the space between the confronting surfaces to permit said surfaces to be brought into abutting relationship.

3. In apparatus for butt welding metal objects, means for holding the objects with their surfaces to be welded in confronting spaced relation; a housing enclosing the adjacent end portions of the objects, and an induction coil positioned within the housing and having a supporting portion extending through the housing to the exterior thereof, said coil being movable into and out of the space between the confronting surfaces of the objects and adapted, when it is in said space and when energized by a high-frequency alternating current, to inductively heat said surfaces to welding temperature, said housing being so constructed and arranged that said induction coil may be moved from between said surfaces whereby said surfaces may be brought into abutting relationship.

4. The method of welding together complementary surfaces on two metallic members which comprises positioning said surfaces in spaced aligned relationship, positioning a high-frequency inductor between said surfaces, flowing high-frequency currents in said inductor to induce high-frequency heating currents to flow in said surfaces and simultaneously continuously moving said inductor in the plane of said surfaces, removing said inductor and, immediately thereafter, bringing said surfaces into pressure-welding engagement.

5. The method of welding together surfaces on two metallic members which comprises providing each of said surfaces with a central recess, positioning said surfaces in spaced aligned relationship, positioning a high-frequency inductor between said surfaces, flowing high-frequency currents in said inductor to induce high-frequency heating currents in said surfaces and, at the same time, moving said inductor continuously in the plane of said surfaces, removing said inductor from between said surfaces and bringing said surfaces into pressure-welding engagement and, thereby, forming an upset area in the plane of said surfaces at least partially extending into said recess.

WILLIAM C. DUNN.

REFERENCES CITED

The following references are of record in the file of this patent:

UNITED STATES PATENTS

| Number | Name | Date |
|---|---|---|
| 569,836 | Matatall et al. | Oct. 20, 1896 |
| 1,004,795 | Lachman | Oct. 3, 1911 |
| 1,714,690 | Nevins | May 28, 1929 |
| 1,765,368 | Frahm et al. | June 24, 1930 |
| 1,902,955 | Holmes | Mar. 28, 1933 |
| 1,943,123 | Kreutz | Jan. 9, 1934 |
| 2,024,906 | Bennett | Dec. 17, 1935 |
| 2,066,668 | Bennett | Jan. 5, 1937 |

FOREIGN PATENTS

| Number | Country | Date |
|---|---|---|
| 463,802 | Great Britain | Apr. 7, 1937 |